United States Patent [19]

DePaoli et al.

[11] Patent Number: 4,846,389
[45] Date of Patent: Jul. 11, 1989

[54] APPARATUS FOR GUIDING CAN BODIES IN A LASER WELDING MACHINE

[75] Inventors: Albano DePaoli, Mühlacker, Fed. Rep. of Germany; Andreas Lanz, Bergdietikon, Switzerland; Michael Baumgartner; Franz Bugmann, both of Dietikon, Switzerland

[73] Assignee: Elpatronic AG, Zug, Switzerland

[21] Appl. No.: 182,791

[22] Filed: Apr. 18, 1988

[30] Foreign Application Priority Data

May 11, 1987 [CH] Switzerland ............... 01794/87

[51] Int. Cl.⁴ .................. B23K 26/08; B23K 26/10; B23K 26/14
[52] U.S. Cl. .................. 228/17.5; 228/46; 228/146; 219/61.3; 219/61.7; 219/64
[58] Field of Search .................. 228/17.5, 44.3, 146, 228/147, 46; 219/64, 61.3, 61.7; 29/464, 466, 467, 33 D, 282

[56] References Cited

U.S. PATENT DOCUMENTS

| | | | |
|---|---|---|---|
| 3,012,130 | 12/1961 | Harrison | 228/222 |
| 3,678,241 | 7/1972 | Erlandson et al. | 219/64 |
| 4,354,090 | 10/1982 | Nilsen | 228/17.5 |
| 4,395,614 | 7/1983 | Weil et al. | 219/64 |
| 4,577,088 | 3/1986 | Sharp | 219/64 |
| 4,621,762 | 11/1986 | Bronowski | 228/222 |
| 4,675,489 | 6/1987 | Opprecht et al. | 219/64 |
| 4,713,519 | 12/1987 | Bersch et al. | 219/64 |
| 4,741,468 | 5/1988 | Weil et al. | 228/17.5 |

Primary Examiner—Nicholas P. Godici
Assistant Examiner—Samuel M. Heinrich

[57] ABSTRACT

An apparatus for guiding can bodies in a laser welding machine is described. The apparatus comprises a water-cooled holding-down shoe (22) with an integrated holding-down roller (24), gas supply (64) and suction extraction (68), the holding-down roller (24) being disposed in front of the theoretical point of intersection of the two edges of the body to be butt-welded and being adjustable in height, with the holding-down shoe (22), to the thickness of the sheet metal. Adjacent to the holding-down shoe (22) is a holding-up shoe (26) and adjacent to the holding-down roller (24) is a holding-up roller (28). Provided below the holding-up shoe (26) is a horizontally and vertically adjustable supporting roller (30) which supports the can bodies at their underside during the welding operation and during passage through the welding plane (10). The bringing together of the edges of the bodies to be butt-welded, which emerge from the Z-rail, is effected by means of this apparatus without much friction and wear, the welding position is protected and any smoke formed during the welding is drawn off. As a result of the supporting roller, too close an adjustment of the conveying means is avoided, through which increased power requirements and wear in the guide range of the Z-rail would be caused.

12 Claims, 3 Drawing Sheets

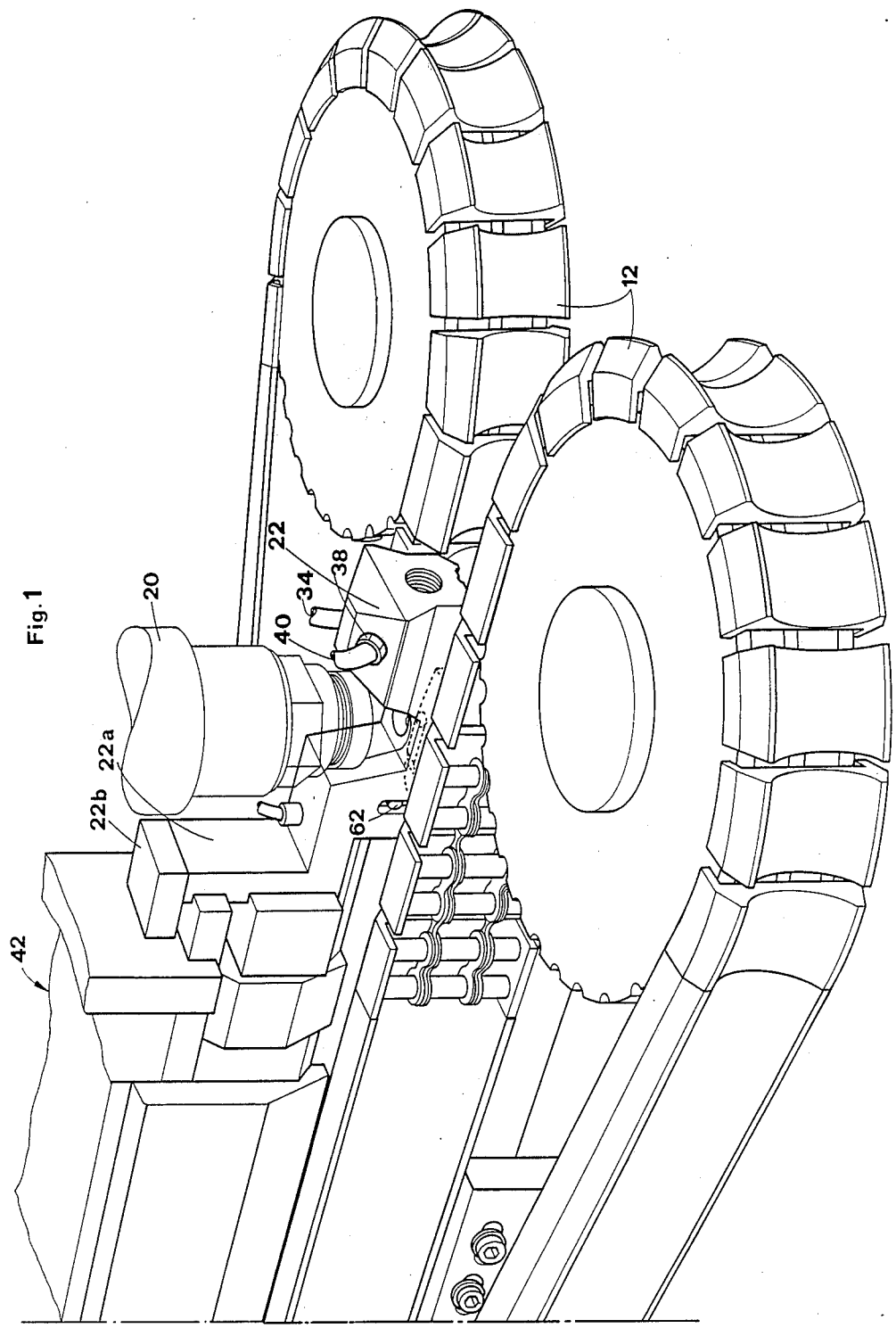

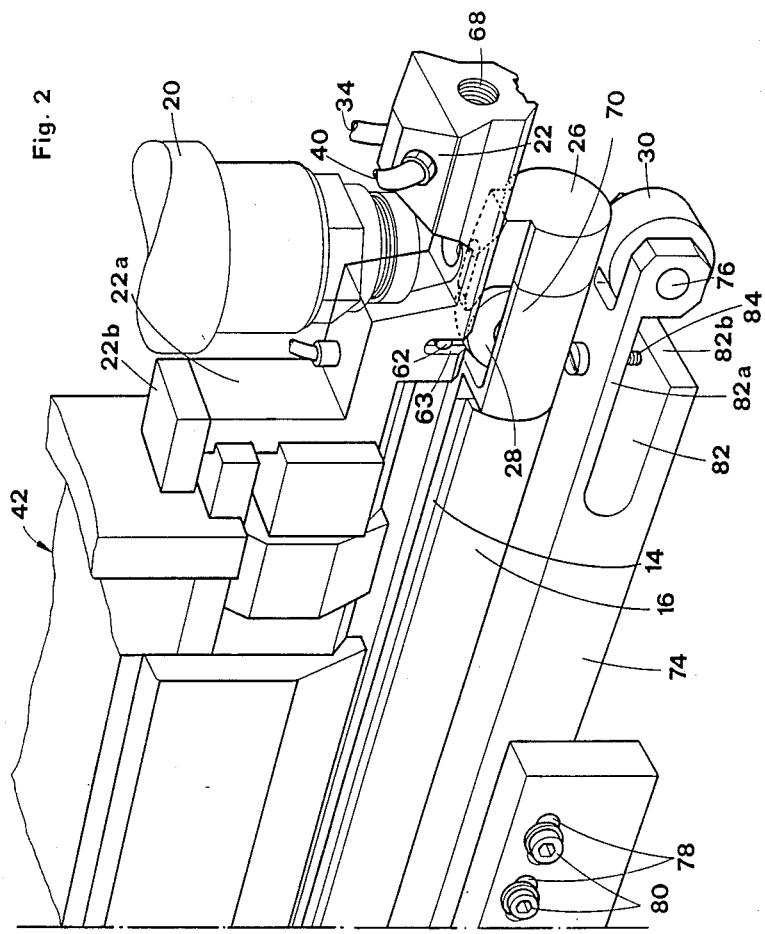

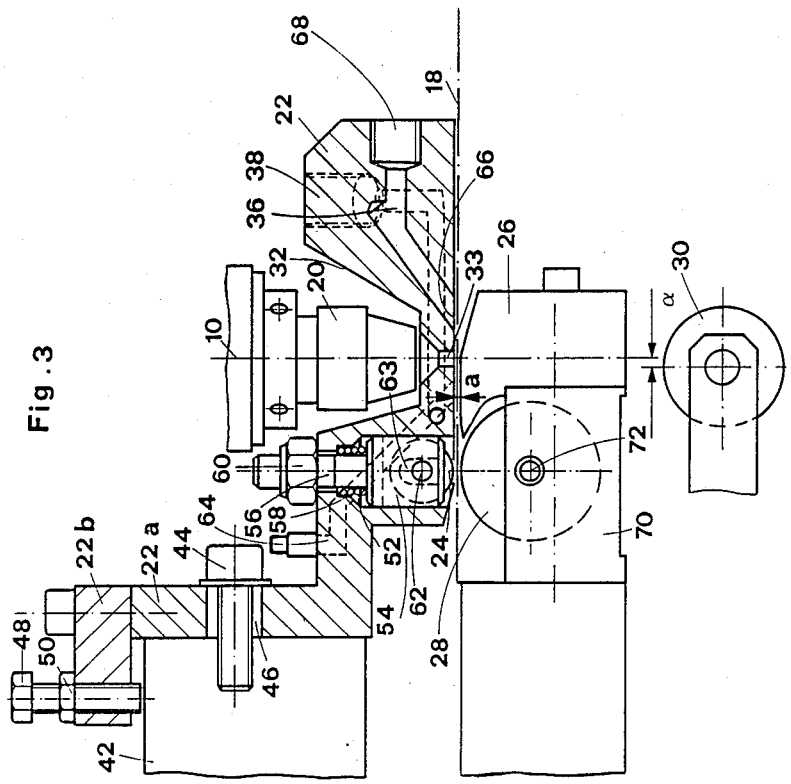

APPARATUS FOR GUIDING CAN BODIES IN A LASER WELDING MACHINE

The invention relates to an apparatus for guiding can bodies in a laser welding machine, having a rounding apparatus for producing the can bodies by rounding plane sheet-metal blanks, having a Z-rail for guiding the two edges of the body to be butt-welded together to within the vicinity of the welding plane and having conveying means for the advance and for the additional guiding of the bodies as far as the welding plane.

Such an apparatus is known from EP 0 058 135 B1. In this known apparatus, the rounding apparatus consists of rollers which are provided over the length of the machine to within the vicinity of the welding plane (that is to say the central plane of the laser beam at right angles to the path of advance of the bodies), and round the plane sheet-metal blanks supplied to the machine, that is to say bring them into a cylindrical shape, and, in the course of this, introduce the edges of the bodies into guide grooves of the Z-rail and hold them therein. In addition, a conveying means (not illustrated in EP 0 058 135 B1) is provided which consists of chain conveyors, reciprocating pistons or the like. It is true that this conveying means effects an additional guiding of the bodies at least as far as the welding plane but it has been found that while the edges of the body leaving the guide grooves of the Z-rail are being brought together, great friction can occur which leads to wear of the Z-rail. In addition, the edges of the bodies at the end of the body cannot always be reliably welded. The conveying means cannot simply be adjusted more closely because that would lead to increased power requirements and to even greater wear in the guide region of the Z-rail. Finally, it has also been recognised already that the quality of the body welding seams produced on such laser welding machines is impaired by oxidation phenomena and the formation of smoke during the welding operation (particularly during the welding of lacquered parts).

It is the object of the invention to develop an apparatus of the type mentioned at the beginning so that welding seams of considerably better quality can be produced.

According to the invention, this problem is solved by the feature given in the characterising part of Patent claim 1.

The holding-down shoe provided, according to the invention, in the region of the welding plane and surrounding the welding area above the path of advance of the bodies eliminates a large proportion of the problems explained above. The holding-down shoe is positioned with regard to its height in the welding plane, according to the thickness of the sheet metal. In cooperation with the correspondingly closely adjusted conveying means, it enables the edges of the can emerging from the Z-rail to be brought together without much friction and without much wear. Since it covers the welding area at least partially in the upward direction, fewer oxidation problems also arise. With appropriately constructed conveying means adapted to the holding-down shoe, even the end of the body can be reliably welded without increased power requirements and wear occurring in the guide region of the Z-rail and on the holding-down shoe.

Advantageous development of the invention form the subject of the sub-claims.

The development of the invention according to claims 2 and 3 offers the advantage that the holding-down shoe can be adapted in a simple manner to various thicknesses of sheet metal and can be matched to a given conveying means in a simpler manner.

In the development of the invention according to claims 4 to 6, a holding-down roller, which is resilient in construction and adjustable in height, is integrated in the holding-down shoe. The holding-down roller renders possible a more sensitive apportioning of the reaction force exerted on the body at the holding-down shoe. The holding-down roller is preferably disposed about 1 mm in front of the theoretical point of intersection of the two edges of the body to be welded together and is adjustable in height, jointly with the holding-down shoe, according to the thickness of the sheet metal.

In the development of the invention according to claims 7 and 8, a holding-up shoe and a holding-up roller are additionally provided and render it possible, with the holding-down shoe and the holding-down roller which are adjacent thereto, to adjust a gap which preferably has a height which is equal to the thickness of the sheet metal plus 10% of the thickness of the sheet metal. As a result an even better bringing together of the edges of the body to be butt-welded is ensured. The holding-up shoe is preferably a little lower (preferably a maximum of 0.03 mm) than the holding-up roller so that the main holding-up function at the inside of the body is fulfilled by the holding-up roller, which means less friction and less wear. For the further reduction of the wear, all guide regions may, of course, be additionally provided with hard facings or hard-metal inserts soldered in.

In the development of the invention according to claim 9, a particularly satisfactory guiding of the bodies results in the region of the welding plane because the horizontally and vertically adjustable supporting roller below the conveying means supports the bodies as they travel through the welding plane. It has been found that, with this supporting roller, the end of the can body can be welded particularly reliably without the advance of the conveying means having to be adjusted too closely which, as mentioned, would lead to increased power requirements and wear in the guiding region of the Z-rail.

In the development of the invention according to claim 10, a particularly reliable protection of the welding area from oxidation and the like results.

In the development of the invention according to claims 11 and 12, the quality of the welding seam is still further improved in that smoke and the like formed during the welding (particularly of lacquered parts) is drawn off from the welding area.

In the development of the invention according to claim 13, the holding-down shoe is connected to a cooling device, preferably to a cooling-water circuit which is present in any case in the laser welding machine, so that the holding-down shoe can be kept at an acceptable temperature without additional external cooling means.

Examples of embodiment of the invention are described in more detail below with reference to the drawings.

FIG. 1 shows, in a perspective illustration, the region of the welding plane of a laser welding machine with caterpillar-type conveyor chains as conveying means for can bodies, the edges of which are to be butt-welded in the welding plane, FIG. 2 shows a similar illustration to FIG. 1 but in which the conveying means have been omitted in order to make visible further parts of the apparatus for guiding can bodies, and FIG. 3 shows, in a longitudinal sectional view, the apparatus according to the invention in which the conveying means have again been omitted.

FIGS. 1 to 3 show a laser welding machine of which only the part adjacent to the welding plane 10 is illustrated. The laser welding machine serves for the butt-welding of the edges of can bodies (not illustrated) which have been produced from plane sheet-metal blanks by rounding in a rounding apparatus (likewise not illustrated) and are supplied to the welding plane by means of a conveying means 12 in the form of conveyor chains. While being advanced by the conveying means 12, the rounded bodies are guided in two adjacent guide grooves 14 (one of them is visible in FIG. 2) of a Z-rail 16 which ends at a distance of a few centimeters before the welding plane 10 but is so constructed that the edges of the bodies emerging therefrom and to be butt-welded are brought together at the point where the path of advance 18 of the bodies (represented in chain line by arrows in FIG. 3) and the welding plane 10 intersect one another. In the prior art, the guiding of the bodies between the end of the Z-rail 16 and the welding plane 10 is effected solely by the conveyor chains 12. Disposed in the welding plane 10 is a laser 20, the laser beam of which effects the welding operation. The construction of the laser welding apparatus described so far is conventional and going into it in more detail appears unnecessary for an understanding of the apparatus according to the invention described in more detail below.

The most important part of the apparatus according to the invention is a holding-down shoe 22 with an integrated holding-down roller 24. The apparatus further includes a holding-up shoe 26, a holding-up roller 28 and a supporting roller 30.

The holding-down shoe 22 is a substantially angular-form part which comprises, in the horizontal arm, a depression 32 which, in the welding plane 10, is provided with a bore 33 which widens out upwards, that is to say towards the laser 20, and serves to allow the laser beam through to the welding position. A water supply pipe 34 leads to a duct 36 in the holding-down shoe 22. The duct 36 leads round the bore 33 and ends at an opening 38 (FIG. 3) to which a water return pipe 40 is connected. The pipes 34 and 40 are resilient flexible pipes which do not hamper the mobility of the holding-down shoe 22. They are connected to the rest of the cooling water circuit in the laser welding machine.

The holding-down shoe 22 is connected, by its vertical arm 22a, to the frame 42 of the laser welding machine by means of a clamping screw 44 which passes with clearance through a through hole 46 and is screwed into a tapped hole in the frame 42. The vertical arm 22a of the holding-down shoe 22 is provided at the top with a transverse arm 22b which comprises a tapped hole into which a setscrew 48 is screwed which can be locked by means of a nut 50. In order to adjust the position of the holding-down shoe 22 with respect to the path of advance 18 of the bodies, the setscrew 48 is appropriately adjusted, with the clamping screw 44 undone and the nut 50 undone, after which the clamping screw 44 and the nut 50 are tightened.

The holding-down roller 24 is arranged in a shoulder bore 52 provided in the holding-down shoe 22 parallel to the welding plane 10, so that it projects downwards somewhat out of the holding-down shoe 22. A holding-down roller carrier 54 is provided at the top with a threaded spindle 56 on which there is disposed a helical spring 58 which is supported on the one hand on the holding-down roller carrier and on the other hand on the shoulder of the shoulder bore 52. Screwed onto the threaded spindle 56 is a nut 60 by means of which the initial tension of the spring and the position of rest of the holding-down roller 24 in relation to the holding-down shoe 22 can be adjusted. The holding-down roller carrier 54 is forked at its lower end. Formed in the arms of the fork, at the bottom, are open slots 63 in which a shaft 62, on which the holding-down roller 24 is mounted for free rotation, is guided for vertical displacement.

Finally the holding-down shoe 22 is provided with a duct 64 which opens out in the vicinity of the welding position at the underside of the holding-down shoe and serves for the supply of gas, for example an inert gas or in general a protective gas, to the welding position. At the opposite side of the welding plane 10, near the welding position, there is an inlet 66 of a vacuum suction device 68 whereby smoke and the like can be drawn off from the welding position.

Below the path of advance 18 of the bodies and adjacent to the holding-down shoe 22 the holding-up shoe 26 is disposed in the welding plane. It is screwed to the end of the Z-rail via an intermediate member 70. The external shape of the holding-up shoe 26, like that of the holding-down shoe 22, can easily be seen from FIG. 2.

Furthermore, the holding-up roller 28 is disposed below the path of advance 18 of the bodies and adjacent to the holding-down roller 24. The holding-up roller 28 is mounted for free rotation on a shaft 72 in an opening in the intermediate member 70.

Finally, at a short distance in front of the welding plane 10 (the terms "in front" and "behind" used here relate to the direction of advance of the bodies), the supporting roller 30 is mounted for horizontal and vertical adjustment.

Disposed parallel to the Z-rail 16 is an arm 74 which is forked at its outer end and carries the supporting roller 30, mounted for free rotation on a shaft 76, between its fork arms. For the horizontal adjustment of the supporting roller 30, the arm 74 comprises two slots 78 through which two clamping screws 80 are screwed into corresponding tapped holes (not illustrated) in the frame 42 of the laser welding machine. In addition to its forked construction at the outer end, the arm 74 is likewise forked in a region 82 situated in front of that. The arm 74 consists entirely, or at least in the region 82, of resiliently deformable material (for example spring steel or the like). A setscrew 84 screwed into a tapped hole in the upper fork arm 82a presses with its lower end against the lower fork arm 82b which is shorter than the fork arm 82a. The supporting roller 30 can be adjusted vertically by turning the setscrew 84. During the welding operation, the can bodies rest with their underside on the supporting roller 30 and are supported by the supporting roller 30 during their passage through the welding plane.

The holding-up shoe 26 is lower than the holding-up roller 28 by a maximum of 0.03 mm. In order to adjust the apparatus according to the invention, the holding-down roller 24 and the holding-up roller 28 as well as the shoes 22 and 26 are adjusted to a spacing $a$ = thickness of the sheet metal + 10% of the thickness of the sheet metal. The adjustment of the holding-down shoe 22 is effected by means of the setscrew 48 and the adjustment of the holding-down roller 24 by means of the nut 60.

The center point of the supporting roller 30 is at a distance $a$ of 1–2 mm in front of the welding plane 10 (see FIG. 3). The adjustment of the supporting roller 30 horizontally is effected by means of the clamping screws 80. The height of the supporting roller 30, that is to say its vertical adjustment, is adjusted by the setscrew 84 according to the welding results. If the supporting roller 30 is adjusted neither too high nor too low, no cracks appear in the welding seam at the beginning of the can body and the end of the body is welded correctly.

We claim:

1. An apparatus for guiding can bodies in a laser welding machine, having a rounding apparatus for producing the can bodies by rounding plane sheet-metal blanks, having a Z-rail for guiding the two edges of the body to be butt-welded into the vicinity of the welding plane and having conveying means for the advance and the additional guiding of the can bodies at least as far as the welding plane, characterized by a holding-down shoe (22) which is disposed in the region of the welding plane (10) at a short distance above the path of advance (18) of the can bodies, and a first adjusting device (48) for adjusting the height of the hold-down shoe at selectively fixed positions relative to the path of advance (18) of the can bodies.

2. An apparatus according to claim 1, characterized in that the adjusting device consists of at least one setscrew (48).

3. An apparatus according to claim 1, characterized by a supporting roller (30) which is disposed a short distance in front of the welding plane (10) and is adjustable horizontally and vertically by means of a third and fourth adjusting device (78, 84).

4. An apparatus according to claim 1, characterized by a device (64) associated with the holding-down shoe (22) to supply the welding position with gas.

5. An apparatus according to claim 1, characterized by a device (66, 68) associated with the holding-down shoe (22) for removing contaminants from adjacent the welding plane.

6. An apparatus for guiding can bodies in a laser welding machine, having a rounding apparatus for producing the can bodies by rounding plane sheet-metal blanks, having a Z-rail for guiding the two edges of the body to be butt-welded into the vicinity of the welding plane and having conveying means for the advance and the additional guiding of the can bodies at least as far as the welding plane characterized by a holding-down shoe (22) which is disposed in the region of the welding plane (10) at a short distance above the path of advance (18) of the can bodies and wherein a hold-down roller (24) is mounted on the hold-down shoe (22) in front of the welding plane (10).

7. An apparatus according to claim 6, characterized by a second adjusting device (54, 56, 60) for adjusting the position of the holding-down roller (24) on the holding-down shoe (22).

8. An apparatus according to claim 7, characterized in that the second adjusting device is a nut (60) cooperating with a threaded spindle (56) of a spring-loaded holding-down roller carrier (54).

9. An apparatus according to claim 6, characterized by a holding-up shoe (26) disposed in the welding plane (10) below the path of advance (18) of the can bodies and adjacent to the holding-down shoe (22).

10. An apparatus according to claim 6, characterized by a holding-up roller (28) disposed below the path of advance (18) of the can bodies and adjacent to the holding-down roller (24).

11. An apparatus for guiding can bodies in a laser welding machine, having a rounding apparatus for producing the can bodies by rounding plane sheet-metal blanks, having a Z-rail for guiding the two edges of the body to be butt-welded into the vicinity of the welding plane and having conveying means for the advance and the additional guiding of the can bodies at least as far as the welding plane, characterized by a holding-down shoe (22) which is disposed in the region of the welding plane (10) at a short distance above the path of advance (18) of the can bodies and a vacuum suction device (68) with a conduit, associated with the holding-down shoe (22) for removing contaminants from adjacent the welding plane, the inlet (66) of which is provided in the holding-down shoe (22) in the region of the welding plane.

12. An apparatus according to claim 1, characterized in that the holding-down shoe (22) is provided with a cooling device (34, 36, 38, 40).

* * * * *